(No Model.)

R. N. ALLEN.
CAR WHEEL.

No. 318,940. Patented June 2, 1885.

Witnesses:
Henry Eichling
Robt. H. Duncan

Inventor
Richard N. Allen
by Saml. A. Duncan
Atty.

UNITED STATES PATENT OFFICE.

RICHARD N. ALLEN, OF CLEVELAND, OHIO.

CAR-WHEEL.

SPECIFICATION forming part of Letters Patent No. 318,940, dated June 2, 1885.

Application filed December 26, 1884. (No model.)

*To all whom it may concern:*

Be it known that I, RICHARD N. ALLEN, of the city of Cleveland, in the county of Cuyahoga and State of Ohio, have invented a new and useful Improvement in Car-Wheels, of which the following is a specification.

The present invention relates to that class of car-wheels in which the tire, the hub, and the body of the wheel are of separate pieces, united and secured together in such manner that the tire, when worn out or broken, can be readily removed and a new tire substituted.

In Letters Patent No. 238,475, granted to me March 1, 1881, for wheels of this class, the tire was secured to the central core and side plates by bolting the overlapping peripheries of the plates through a web projecting inwardly from the face of the tire and through the periphery of the core. In such construction it is desirable to make the central core in one block or piece, and consequently it is necessary to form the web off from the center of the tire, and nearer the outer edge thereof, and when the plates are secured as shown in that patent the outside plate, which is in contact with and is bolted directly to the web of the tire, is much more firmly united to the tire than the plate upon the other side of the wheel, which is only secured to the tire by the bolt, which first passes through the width of the core. This construction leaves the union of the inner plate of the wheel to the tire less secure than is desired.

It is the object of the present invention to provide means for uniting the periphery of the inner plate directly to the tire, and thereby render the attachment of this plate to the tire as firm and reliable as that of the outer plate; and I accomplish this by forming the periphery of the inner plate into an inwardly-projecting flange, which is forced into an annular groove formed in the edge of the tire.

Figure 1:
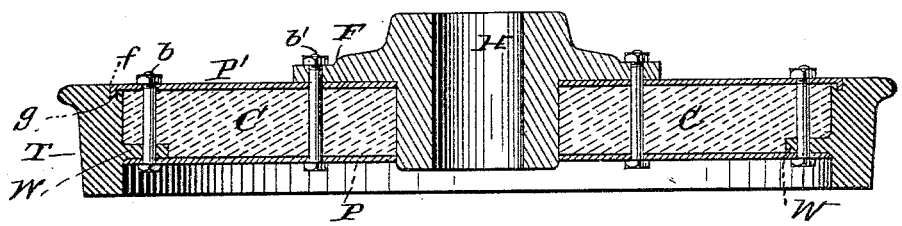
Figure 2:
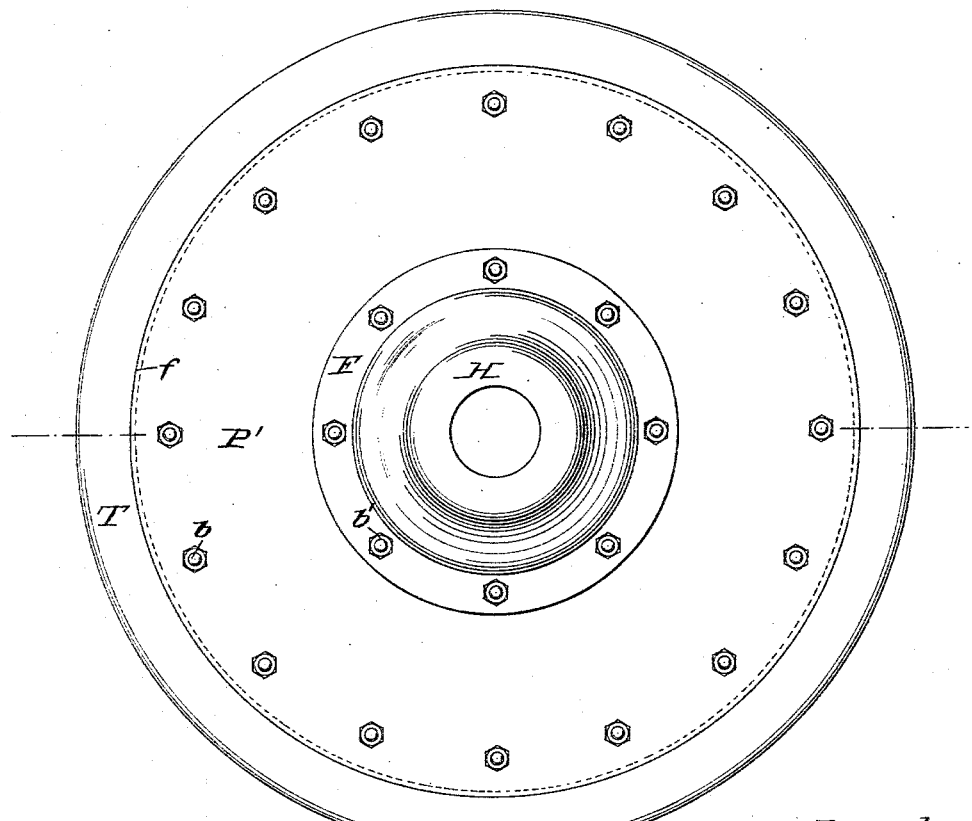

The invention is illustrated in the accompanying drawings, in which Figure 1 is a central cross-section of a car-wheel containing my improvement, and Fig. 2 is a view in elevation of the inner side or face of the same.

In the drawings, T represents the tire of the wheel, which is provided with a web or flange, W, located near the outer edge of the tire, and projecting from its inner face toward the center of the wheel. On the inner edge of the tire is an annular groove, $g$.

P represents the outer plate of the wheel, the periphery of which overlaps the web W.

P′ is the inner plate, whose periphery is provided with a flange, $f$, corresponding with and entering into the groove $g$, formed in the tire. The inner or central peripheries of both of the plates P and P′ are in contact with the hub H of the wheel.

F is a flange projecting outward from the hub.

C is the central core, of compressed paper or similar material, filling the space between the hub and tire, and inclosed laterally by the plates P P′. The tire is secured to the plates P and P′ and to the core C by means of a series of bolts, $b\ b$, passing through the web W, the plates P and P′, and the core C, and the plate P′ is also secured directly to the tire by the flange $f$, entered into the corresponding groove, $g$. The plates P and P′ and the core C are also secured to the hub by a series of bolts, $b′\ b′$, passing through the said plates and core and through the flange F of the hub.

The several parts above described of which the wheel is composed are conveniently and effectively brought together and secured in place in the following way: The plate P is first forced into position upon the hub H, then the core C, then the tire, the flange $f$ being inserted into the groove $g$, and, lastly, the outer plate, P. Hydraulic pressure is conveniently employed to force the several parts into their final relative positions. The bolt-holes are then bored and the bolts inserted and drawn and held in place by their nuts.

The tire is preferably made of cast-steel rolled into the proper shape and size, and the plates P and P′ are made of wrought-iron or steel or other proper metal. The core C is preferably made of compressed paper.

It is readily seen that in the above-described construction the tire is secured directly to the peripheries of each of the side plates in such manner that it cannot be sprung or forced from out of contact with either plate without actually breaking the bolts in the one case or the retaining-flange in the other, and at the same time the core is held in its proper position by the bolts passing through the plates and the web of the tire and the core.

What is claimed as new is—

A car-wheel composed of a tire provided with a web, W, projecting inwardly from its face and located off from its central line, a central core, C, a hub, H, and side plates, P and P', one of which is bolted directly to the web of the tire, while the opposite plate is secured to the tire by a flange upon its periphery entered into a corresponding groove formed in the edge of the tire, the several parts being secured together by bolts, substantially as set forth.

RICHARD N. ALLEN.

Witnesses:
 ROBT. H. DUNCAN,
 R. F. GAYLORD.